(12) United States Patent
Hansen et al.

(10) Patent No.: US 7,722,102 B2
(45) Date of Patent: May 25, 2010

(54) FLOATING PARKING BRAKE GAP HIDER

(75) Inventors: Alison Hansen, Flint, MI (US); Gary J Nivelt, Clarkston, MI (US); Kenneth E Zalewski, Shelby Township, MI (US); Mark A Kelly, Shelby Township, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 59 days.

(21) Appl. No.: 11/612,243

(22) Filed: Dec. 18, 2006

(65) Prior Publication Data

US 2007/0152465 A1    Jul. 5, 2007

Related U.S. Application Data

(60) Provisional application No. 60/751,523, filed on Dec. 19, 2005.

(51) Int. Cl.
*B60R 7/04* (2006.01)
*B60R 13/00* (2006.01)
*G05G 1/04* (2006.01)

(52) U.S. Cl. ..................... 296/24.34; 296/37.8; 74/566

(58) Field of Classification Search .............. 296/24.34, 296/37.8, 216.03, 39.1; 180/315, 336; 74/523, 74/566; 384/147, 15
See application file for complete search history.

(56) References Cited

U.S. PATENT DOCUMENTS

| 1,457,141 | A | * | 5/1923 | Bockover et al. | ........... 180/90.6 |
| 4,823,629 | A | * | 4/1989 | Ha | .............. 74/335 |
| 5,622,086 | A | * | 4/1997 | Suzuki et al. | ................. 74/566 |
| 5,887,485 | A | * | 3/1999 | VanOrder et al. | ......... 74/473.15 |
| 6,892,664 | B2 | * | 5/2005 | Stinson | ...................... 114/255 |
| 2006/0230871 | A1 | * | 10/2006 | Iekura et al. | .................. 74/523 |

* cited by examiner

*Primary Examiner*—Glenn Dayoan
*Assistant Examiner*—Melissa A Black
(74) *Attorney, Agent, or Firm*—Ralph E. Smith

(57) ABSTRACT

A console housing has a top wall formed with an opening that receives an upwardly extending handle of a parking brake. A gap hider includes a close out insert for closing the gap between the opening and the handle. The close out insert is supported on the top wall for limited floating movement so that it will not interfere with the operation of the parking brake handle.

18 Claims, 4 Drawing Sheets

FLOATING PARKING BRAKE GAP HIDER

CROSS-REFERENCE TO RELATED APPLICATION(S)

This application claims the benefit of U.S. provisional patent application Ser. No. 60/751,523, filed Dec. 19, 2005.

FIELD OF THE INVENTION

The present invention relates generally to a center console of a motor vehicle, and more particularly to a center console having a close out insert for closing the gap between a parking brake handle and an opening in the console through which the handle extends.

BACKGROUND OF THE INVENTION

It is common practice for the handle of a parking brake to extend upwardly through an opening in the console. Typically there is a gap between the opening and the handle. The gap is needed for console loading and build tolerance. A permanently attached close out to close the gap often interferes with the operation of the parking brake. Such interference requires excess effort to operate the parking brake and can result in damaged parts. Then too, a permanently attached close out may still leave space around the handle.

SUMMARY OF THE INVENTION

In accordance with the present invention, a gap hider comprising a loosely mounted or floating close out insert is provided to close the gap between the console opening and the parking brake handle. The handle projects through a slot in the insert. Because the insert is capable of limited floating movement relative to the console, there will be no damage to the parts nor any interference with the operation of the parking brake.

More particularly, and according to the embodiment about to be described, the insert is slidably received in channels on the console. The insert can slide in the channels laterally as well as longitudinally.

The close out insert is preferably in the form of an elongated flexible cover strip.

Further areas of applicability of the present invention will become apparent from the detailed description provided hereinafter. It should be understood that the detailed description and specific examples, while indicating preferred embodiments of the invention, are intended for purposes of illustration only and are not intended to limit the scope of the invention.

BRIEF DESCRIPTION OF THE DRAWINGS

The present invention will become more fully understood from the detailed description and accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figure 1:
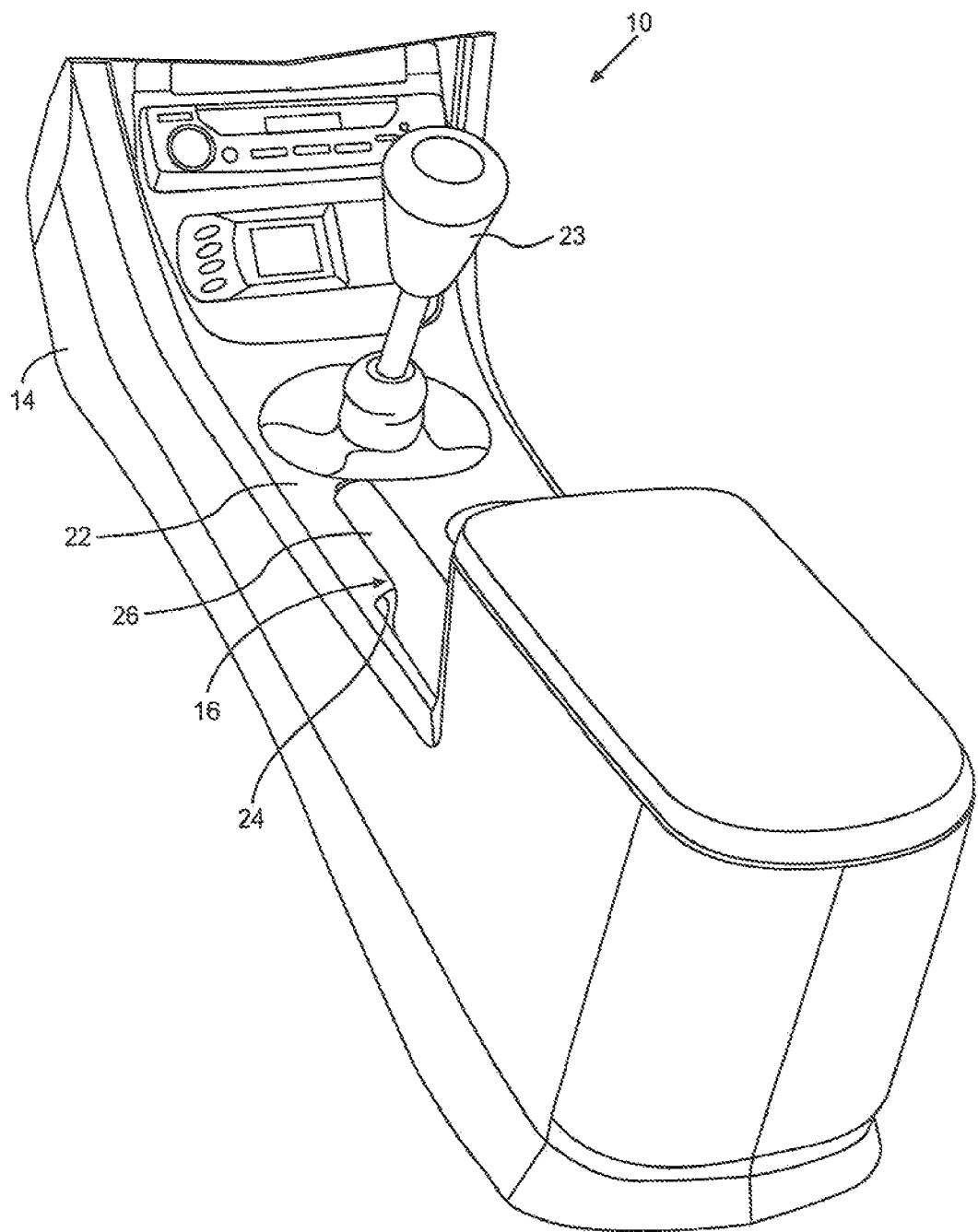
FIG. 1 is a perspective view of a center console constructed in accordance with the invention.
Figure 2:
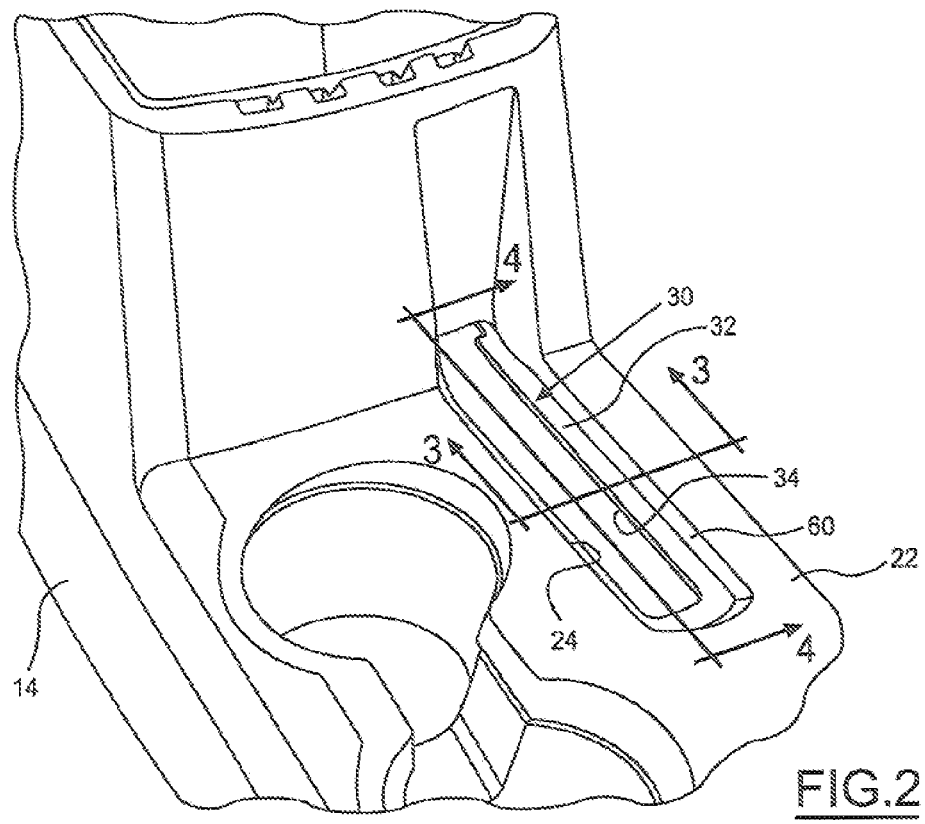
FIG. 2 is a enlarged fragmentary perspective view of the console showing the close out insert extending across an aperture in the top wall of the console, but omitting the parking brake handle.

Referring now more particularly to the drawings, there is shown a center console 10 of a motor vehicle. The center console comprises a housing 14 overlying a parking brake handle 16 which operates a parking brake (not shown) by means of a cable 18 pivoted at 19 to the parking brake handle. The parking brake handle 16 is pivoted at 20 on a transverse horizontal axis in a fixed position beneath the top wall 22 of the console housing. A gear shift level 23 shown in FIG. 1 is not part of this invention.

Figure 4:
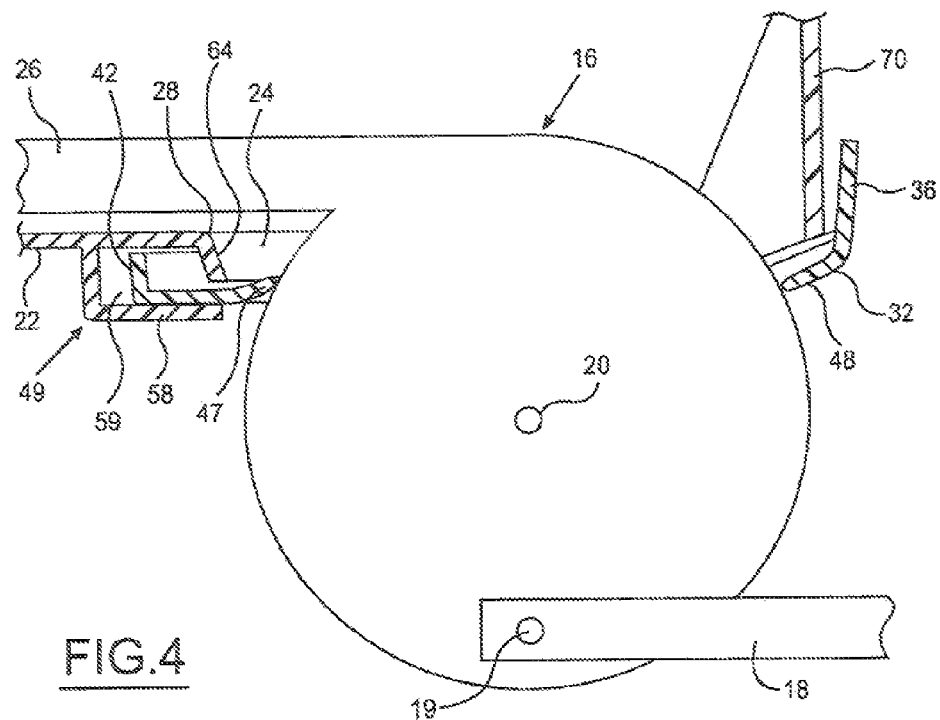
FIG. 4 is a sectional view taken on the line 4-4 in FIG. 2.
Figure 5:
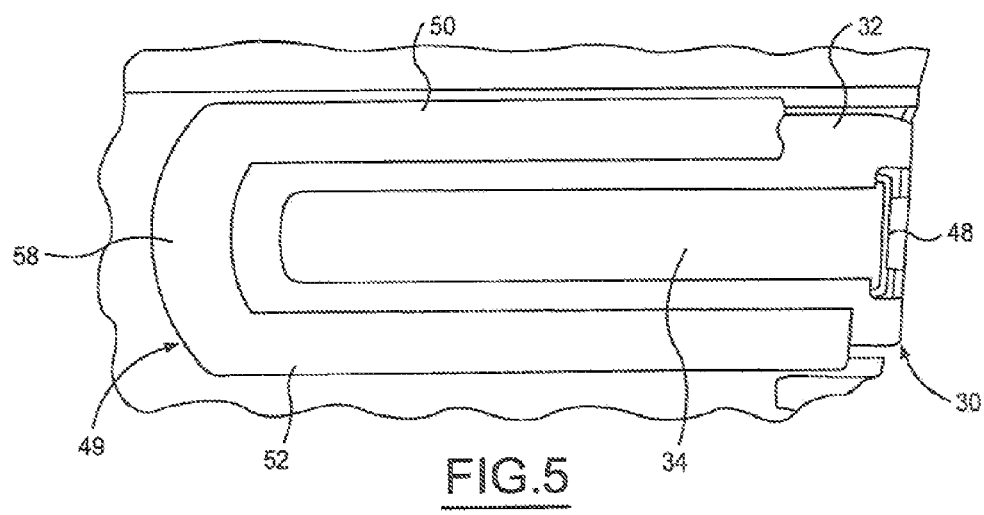
FIG. 5 is a fragmentary elevation showing channel-forming tracks on the underside of the top wall of the console and the close out insert in the channels.

As seen in FIG. 4, the parking brake handle 16 is in the form of a circular disc and projects upwardly through an opening 24 in the top wall 22 of the housing. The handle terminates in a hand grip 26 above the top wall. The opening 24 is in the form of an elongated aperture 28 which is larger than the handle, creating a gap between the aperture and the handle. The console 10 is installed by loading it over the handle 16 and the gap is needed to facilitate console loading and also to accommodate build tolerance.

Figure 6:
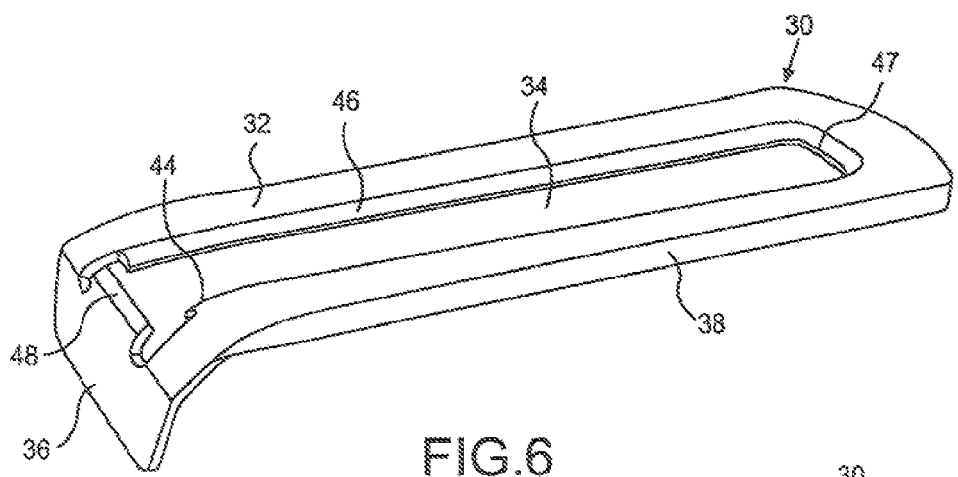
FIG. 6 is a perspective view of the close out insert.
Figure 7:
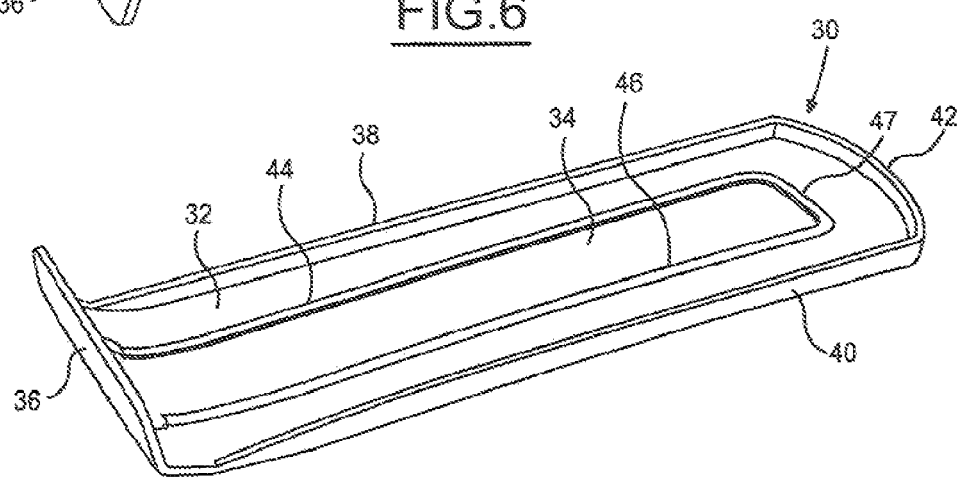
FIG. 7 is a perspective view of the close out insert as seen from a different angle.
Figure 8:
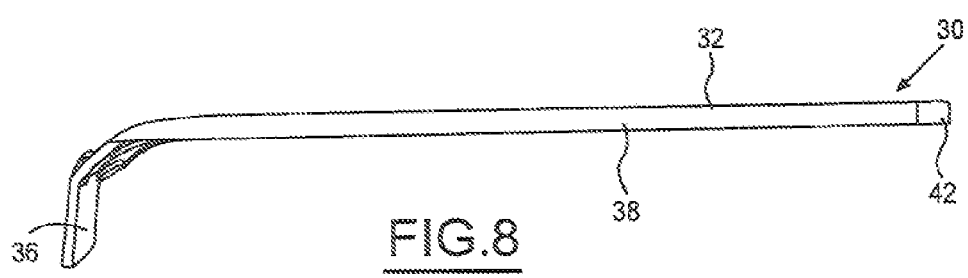
FIG. 8 is a side view of the close out insert.

The gap between the handle 16 and the aperture 28 is closed by a close out insert 30 in the form of an elongated cover strip 32 made of a flexible material such as natural or synthetic rubber (see FIGS. 6-8). The cover strip 32 has an elongated center slot 34 which extends lengthwise of the cover strip and is closed at both ends. The cover strip is generally flat throughout its length, but has a turned-up tab 36 at the rear end. Upturned flanges 38, 40 and 42 extend along the outer side edge portions of the cover strip 32 and along the front end of the cover strip. The opposite side edges of the slot 34 have up-turned flanges 44 and 46. The front edge of the slot 34 has an upturned flange 47. The tab 36 has a lip 48 which closes the rear end of the slot 34. The handle 16 is closely received in the slot 34, with its side surfaces in continuous contact with the flanges 44 and 46 on opposite sides of the slot and its end surfaces in continuous contact with the flange 47 at the front of the slot and with the lip 48 on the tab 36 at the rear of the slot.

On the underside of the top wall 22 of the housing, there is a retainer 49 for holding the cover strip 32. The retainer 49 comprises a pair of laterally spaced apart elongated parallel side tracks 50 and 52 which are on opposite sides of the aperture 28 and extend parallel to the aperture. The two tracks cooperate with the undersurface of the top wall 22 of the housing to defined elongated laterally spaced apart side channels 54 and 56 which are parallel to the aperture 28 and open inwardly toward one another. At the front end of the side tracks 50 and 52, there is a transverse connecting end track 58 which connects to the ends of the side tracks and provides an end channel 59 that communicates with the side channels 54 and 56 to form one continuous generally U-shaped groove. The tracks 50, 52 and 58 are generally L-shaped in cross section, having a vertical outer wall connecting into the top wall 22 of the housing, and a horizontal bottom wall.

The sides of the aperture 28 in the top wall 22 of the housing have downturned abutment flanges 60 and 62. The front end of the aperture 28 has a downturned abutment flange 64. The abutment flanges 60, 62 and 64 limit the floating movement of the insert.

Figure 3:
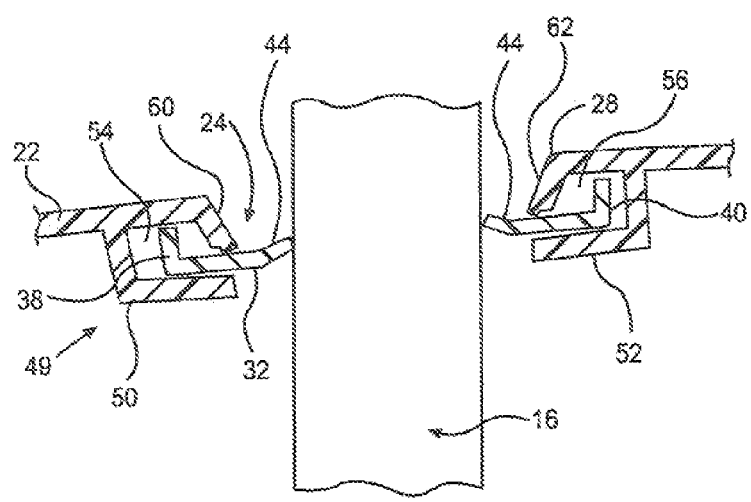
FIG. 3 is a sectional view taken on the line 3-3 in FIG. 2.

As seen in FIGS. 3 and 4, the cover strip 32 has its opposite side portions extending lengthwise within the side channels 54 and 56 and its front end portion disposed in the end channel 59. The flange 38 of the insert is captured between the abutment flange 60 of the top wall 22 and the vertical wall of the track 50, the flange 40 of the insert is captured between the abutment flange 62 of the top wall 22 and the vertical wall of the track 52, and the flange 42 of the insert is captured between the abutment flange 64 of the top wall 22 and the vertical wall of the track 58. The cover strip 32 is of a width relative to the width of the channels 54 and 56 such that it can slide or float from side to side, limited by the vertical wall of the tracks 50 and 52 and the flanges 60 and 62 of the aperture 28. The cover strip 32 is of a length relative to the length of the side channels 54 and 56 such that it can slide or float from front to rear, limited by the vertical wall of the track 58 and the flange 64 of the aperture and also by an abutment wall 70 of the housing which overlaps the tab 36 of the cover strip.

The parking brake handle 16 can be pivoted about the pivot 20 to apply and release the parking brake, but any gap between the parking brake handle and the aperture 28 will be closed by the floating close out insert 30.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A console for an automotive vehicle, comprising:
a console housing having a top wall formed with an opening for receiving an upwardly extending handle of a parking brake,
a gap hider including a close out insert that closes a gap between the upwardly extending handle and the opening, said insert having a slot closely receiving the upwardly extending handle,
a retainer on the top wall of the console supporting said insert and enabling floating movement during handle movement during handle operation so that the insert will not interfere with the operation of the handle wherein said retainer comprises (a) a side track spaced from the top wall defining a channel therebetween in which a portion of said insert that includes an outer edge is disposed, and (b) a retainer flange that extends toward said insert, and
wherein said portion of said insert disposed in said channel comprises an insert flange extending generally perpendicularly relative to horizontal.

2. The console of claim 1, wherein said opening is elongate and defined by elongate sides of said top wall and wherein said retainer comprises a pair of said channels disposed underneath said top wall slidably receiving a corresponding side edge and portion of said insert with each one of said channels being elongate, parallel to one another, and extending along opposing elongate sides of said elongate opening, wherein said retainer flange of each said channel extends generally downwardly from said top wall toward said insert, and wherein said insert flange disposed in each said channel extends from at or adjacent a corresponding said side edge of said insert toward said top wall.

3. The console of claim 1, wherein said opening comprises an elongated aperture, and said retainer comprises a pair of opposed and elongated laterally spaced apart side channels each formed by a corresponding side track and portion of said top wall and which are parallel to said aperture and open toward one another with each side channel having a corresponding said retainer flange that also defines a corresponding opposing side of said elongated aperture, and said insert comprises an elongated cover strip extending lengthwise of said aperture, said cover strip having opposite side portions slidably received in said channels with each said side portion of said cover strip comprising said insert flange extending in a direction opposite an adjacent corresponding retainer flange.

4. The console of claim 3, wherein said cover strip is of a width relative to the width of said side channels such that said cover strip is capable of limited lateral movement in said side channels.

5. The console of claim 3, wherein said cover strip is of a length relative to the length of said side channels such that said cover strip is capable of limited longitudinal movement in said side channels.

6. The console of claim 5, wherein said cover strip is of a width relative to the width of said side channels such that said cover strip is capable of limited lateral movement in said side channels.

7. The console of claim 3, wherein each said track underlies said top wall.

8. The console of claim 7, further including an end track on the underside of said top wall which cooperates with said top wall in defining an end channel, the end channel slidably receiving an end portion of the cover strip.

9. The console of claim 8, wherein said cover strip has one end provided with a flange engageable with an abutment flange on the housing limiting the longitudinal movement of the cover strip.

10. The console of claim 9, wherein said cover strip has an opposite end provided with a tab engageable with an abutment wall on the housing limiting the longitudinal movement of the cover strip.

11. The console of claim 10, wherein said slot has a marginal edge provided with a turned-up flange facilitating installation of the console housing over the handle of the parking brake.

12. A console for an automotive vehicle, comprising:
(a) a console housing having a top wall with an elongate opening having a first width defined by a pair of elongate inner side edges and comprising a channel disposed underneath the top wall extending along each inner side edge,
(b) a gap hider comprising an elongate close out insert disposed in the elongate opening in the console housing top wall that includes (i) an elongate longitudinally extending slot defined by a pair of spaced apart elongate and opposing slot edges providing a width narrower than the width of the elongate opening with each slot defining edge spaced inwardly from a corresponding adjacent elongate opening inner side edge of the console housing top wall, and (ii) a pair of elongate outer side edges, each of which is received in a corresponding one of the channels enabling relative movement between the close out insert and the console housing top wall, and
(c) an elongate handle of a parking brake that is longitudinally receivable in the elongate slot in the close out insert with each elongate slot edge of the elongate slot in the close out insert adjoining a corresponding adjacent portion of the parking brake handle on either side of the parking brake handle, and wherein the top wall of the console housing comprises a retainer flange at or adjacent each inner side edge that extends downwardly from the top wall of the console housing toward an adjacent portion of the close out insert and wherein the close out insert comprises a flange received in each one of the channels that extends upwardly relative to horizontal toward an adjacent portion of the top wall of the console housing.

13. The console of claim 12, wherein each slot defining edge comprises an upturned flange that contacts the parking brake handle when the parking brake handle is disposed in the slot.

14. The console of claim 12 wherein each channel is comprised of a side track generally parallel to and disposed underneath a portion of the console housing top wall with the side track attached to the console housing rap wall by a generally downwardly extending leg spaced from an adjacent corresponding one of the close out insert side edges enabling generally horizontal relative movement between the close out insert and the console housing top wall.

15. A console for an automotive vehicle, comprising:
  (a) a console housing having a top wall with an elongate opening having a first width defined by a pair of elongate inner side edges that each comprises a downturned flange and a channel formed by a portion thereof and a side track ledge that underlies the top wall,
  (b) a gap hider comprising an elongate close out insert disposed in the first elongate opening in the console housing top wall that includes (i) an elongate slot defined by a pair of spaced apart slot edges providing a width narrower than the width of the elongate opening with each slot defining edge spaced inwardly from a corresponding adjacent elongate opening inner side edge, and
  (ii) a pair of elongate outer side edges each comprising an upturned flange, each of which is received in a corresponding one of the channels between an adjacent portion of the console top wall and a portion of the corresponding side track ledge enabling generally horizontal transverse relative movement between the close out insert and the console housing top wall, and
  (c) an elongate handle of a parking brake that is receivable in the second elongate slot with each inner side edge of the second elongate opening in the close out insert adjoining a corresponding adjacent portion of the parking brake handle.

16. The console of claim 15, wherein the channel extends along one end of the opening being defined by part of the console housing top wall and an end track ledge that underlies the console housing top wall and the one end of the close out insert comprises an upturned flange received in a portion of the channel extending along the one end of the opening and wherein the close out insert is movable in a longitudinal direction relative to the console housing.

17. The console of claim 16, wherein the other end of the opening is defined by an upwardly extending abutment wall of die console housing and the other end of the close out insert comprises (i) a lip closing the rear end of the slot and contacting part of the elongate handle of the parking brake, and (ii) a turned up tab overlapping the abutment wall.

18. The console of claim 15, wherein each inner slot side edge of the close out insert comprises an elongate longitudinally extending upturned flange that contacts part of a side of the elongate handle of the parking brake when the elongate handle is disposed in the slot in the close out insert.

\* \* \* \* \*